United States Patent [19]

Robertson

[11] Patent Number: 5,027,211

[45] Date of Patent: Jun. 25, 1991

[54] MULTI-CHANNEL MESSAGE DISPLAY SYSTEM AND METHOD

[76] Inventor: Bruce W. Robertson, 7342 S. 1540 E., Salt Lake City, Utah 84121

[21] Appl. No.: 362,692

[22] Filed: Jun. 7, 1989

[51] Int. Cl.$^5$ ............................................. H04N 5/272
[52] U.S. Cl. ..................................... 358/183; 358/22; 340/721
[58] Field of Search ................... 358/183, 181, 22, 86, 358/84; 455/3, 2, 4, 6; 340/721

[56] References Cited

U.S. PATENT DOCUMENTS

| | | | |
|---|---|---|---|
| 3,891,792 | 6/1975 | Kimura | 358/183 |
| 3,909,818 | 9/1975 | Dalke et al. | 340/152 |
| 3,911,420 | 10/1975 | Lampson | 358/183 |
| 4,180,805 | 12/1979 | Burson | 340/709 |
| 4,281,345 | 7/1981 | Warn | 358/183 |
| 4,328,557 | 5/1982 | Gastinel | 340/750 |
| 4,338,624 | 7/1982 | d'Hautecourt et al. | 358/22 |
| 4,374,399 | 2/1983 | Esinger | 358/147 |
| 4,398,190 | 8/1983 | Long et al. | 340/728 |
| 4,419,662 | 12/1983 | Puskas | 358/183 |
| 4,435,729 | 3/1984 | Harwood | 358/183 |
| 4,441,105 | 4/1984 | Van Vliet et al. | 340/750 |
| 4,498,098 | 2/1985 | Stell | 358/22 |
| 4,595,953 | 6/1986 | Willis | 358/183 |
| 4,599,611 | 7/1986 | Bowker et al. | 358/22 |
| 4,626,837 | 12/1986 | Priestly | 358/183 |
| 4,631,585 | 12/1986 | Wine | 358/148 |
| 4,633,297 | 12/1986 | Skerlos et al. | 358/22 |
| 4,675,737 | 6/1987 | Fujino | 358/183 |
| 4,698,677 | 10/1987 | Kinghorn et al. | 358/147 |
| 4,862,272 | 8/1989 | Karlock | 358/181 |

*Primary Examiner*—Tommy P. Chin
*Attorney, Agent, or Firm*—M. Reid Russell

[57] ABSTRACT

A multi-channel video message display system that includes a single controller with plurality of channel modules, one for each channel and utilizes a single character generator at a broadcast or rebroadcast source that places alpha numeric or symbolic messages on a single or multiple non-synchronous television channels, where the synchronization pulses of a video input that are passed to the various channels are never replaced by externally generated signals. Horizontal drive sync pulses as are present in a television video signal are utilized as the driving pulses for the output of each channel module and character information is inserted into the channel modules by switching from the video signal input to the pixel digital input only during times when the trace is visible on a television screen. Pixel form allows any number of channels to be serviced by one character generator, with data held in memory in the channel modules transmitted in pixel form into the video signal with simple real time timing pulses.

9 Claims, 2 Drawing Sheets

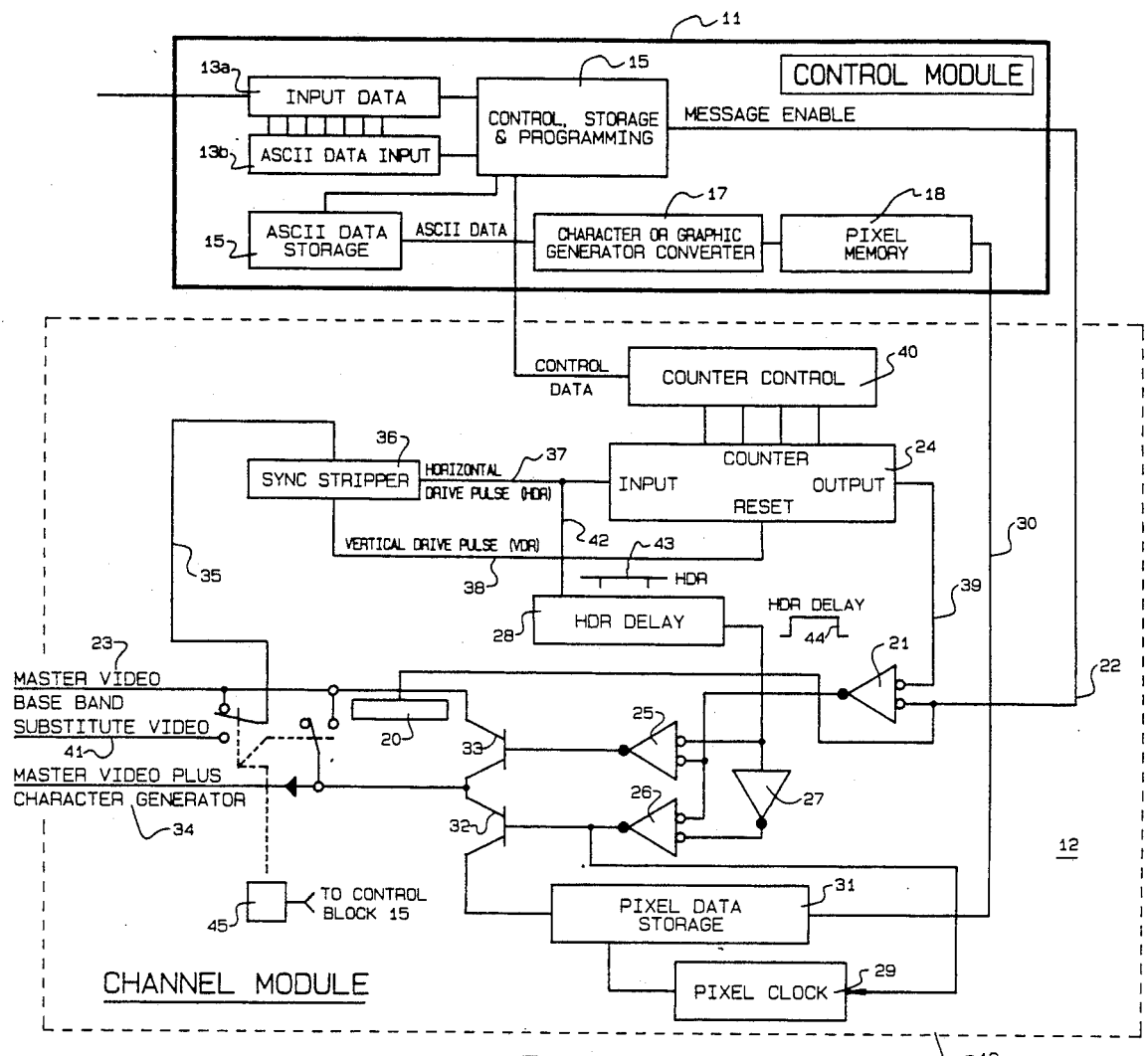
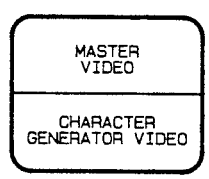
Fig. 4a
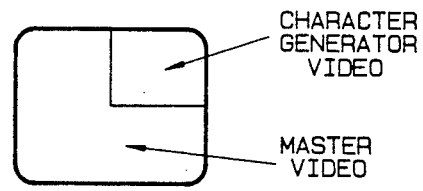
Fig. 4c
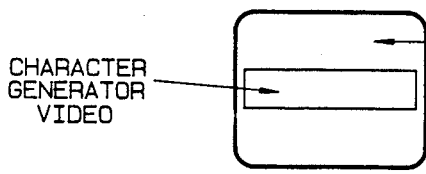
Fig. 4b
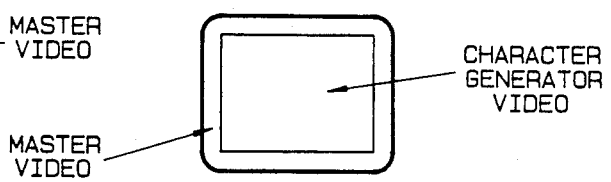
Fig. 4d

MULTI-CHANNEL MESSAGE DISPLAY SYSTEM AND METHOD

BACKGROUND OF THE INVENTION

1. Field of the Invention

The present invention relates to systems and processes that provide for multiple imaging upon a television display and particularly to a system for distribution and presentation of alpha numeric and symbolic information on a multiple channel television system or systems.

2. Background

Cable television and other closed circuit television distribution systems presently distribute from one to over one hundred video signals. These signals originate from various sources, are not necessarily in synchronization with each other and are received and redistributed on the same channel or on different channels. This invention provides a method using one character generator circuit whereby alpha numeric or symbolic messages can be economically distributed to all individual television channels. This distribution may be a single message to a single channel, multiple messages to a single channel, multiple messages to multiple channels or a single message to multiple channels. The benefits of the ability to direct messages to channels in this fashion is illustrated in the following uses: a single message can be displayed on a single channel to notify subscribers that a program has been preempted or blacked-out; multiple messages to a single channel or multiple channels can be used to convey information; and a single message to multiple channels is ideal for use as an emergency message display system.

Cable television has for some time needed an emergency alert which could place messages onto programming on individual channels of a multiple channel system as a public service. Emergency alert systems as are presently available are audio based whereby an audio alert is introduced across all channels and the video signal turned off, or whereby a video message is caused to replace the video signal normally feed to that specific channel or all channels of a cable system. Constant reference is herein made to cable systems, though it should be understood, the same reasoning and explanation apply to an system which distributes multiple channels of video information. Some examples of other such systems would be hotels, businesses, colleges, or any community with closed circuit cable systems. These audio and full screen video replacements function properly as designed, but are seldom used because they totally disrupt operation of all channels of the system. This means the systems tend to be used only when the emergency actually exists such as a tornado has hit town or wind gusts are doing significant damage to a large area. The invention being considered provides the ability to prepare a community for an emergency in that it can display messages on all channels of a cable system without totally interrupting that system and it will therefore be used because it can notify without total disruption of basic operation.

3. Prior Art

The specific area toward which the present patent application is aimed defines a system of video character generation (alpha numeric display on a television screen) which is applicable to, but not limited to, emergency alert, blackout, promo, and timed messages.

The present invention utilizes a single character generator, which transfers pixel data to all channel modules, and the channel modules simply display that pixel data. Pixel data is individually synchronized into the program video of the video source or channel over which it is to be shown by the channel modules.

Devices for displaying a message over an existing video signal are common in television broadcasting. Such character generators, however, are limited to single channel operation rather than having economical multi-channel capability as does the present invention and are accordingly prohibitively expensive for use by a cable television company rebroadcasting a number of channels who must integrate a message on each or a number of the channels it rebroadcasts.

As set out above, heretofore, a message or messages into the video programs carried by one or a number of channels, unlike the present invention, has required a character generator for each channel. Further, where a multi-channel character display has been provided, for example, a patent to Dalke, et al., U.S. Pat. No. 3,909,818, shows such a system that provides for sorting input information and sending it for processing to a number of character generators and requires one character generator for every channel to be served. Whereas, the present invention provides for a multi-channel capability using a single character generator that is for location at the broadcast or rebroadcast source.

Like the Dalke, et al. patent, a number of message or information display systems have been developed for inclusion with a television receiver for providing a display that is integrated into a video display on a single channel at a time. Examples of a number of such systems are shown in patents as set out below, for example, a patent to Kimura, U.S. Pat. No. 3,891,792, involves a shift register and character generator that provides a message that crawls across the television screen. Burson, U.S. Pat. No. 4,180,805, is concerned with graphic color and provides an internal counter for generating horizontal and vertical drive pulses, rather than, as does the present invention, utilizing the horizontal and vertical drive pulses as exist in the received video for timing. A patent to Gastinel, U.S. Pat. No. 4,328,557, in addition to applying to a television set, does not address multiple channels, and is further unlike the present invention in that it is directed to a digital processor and cursor position indicator associated therewith. A patent to d'Hantecourt, et al., U.S. Pat. No. 4,338,624, is essentially a digital processor for connection to a conventional television and provides for modulating interface circuits for display of characters in specific colors. At patent to Ensigner, U.S. Pat. No. 4,374,399, is involved with a data encoder and method for data transfer rather than a data display that the present invention is directed to. A patent to Long, et al., U.S. Pat. No. 4,398,190, is concerned with a single CRT display rather than data transmission. A patent to Puskas, U.S. Pat. No. 4,419,662, deals with a multi-function character generator for a conventional television receiver. Horwood, et al., U.S. Pat. No. 4,435,729, is directed to a television receiver that includes a character generator. A patent to Van Vliet, et al., U.S. Pat. No. 4,441,105, provides a character generator for a television monitor that is addressed by external devices. Patents to Stell, U.S. Pat. No. 4,498,098, and to Bowker, et al., U.S. Pat. No. 4,599,611, each provide systems for closely timing a video switch to a video source for locking a computer generated graphics picture to a video signal at a television receiver. Willis, U.S. Pat. No. 4,595,953, shows a television receiver that includes a character generator with time lock and burst lock synchronizing arrangements, and patents to Skerlos, et al., U.S. Pat. No. 4,633,297, and Kinghorn, et al., U.S. Pat. No. 4,698,677, showing television receivers with micro processors. A patent to Priestly, U.S. Pat. No. 4,626,837, teaches a display interface for a television receiver that, like the present invention, utilizes vertical and horizontal drive pulses to generate access address data, but lacks a multi-channel and dot matrix type display capabilities of the present invention. Somewhat like the present invention a patent to Wine, U.S. Pat. No. 4,631,585, shows a utilization of vertical drive pulses for reset, it does not: utilize horizontal drive pulsing for signal access; is for use with a television receiver; and lacks the different input multi-channel capabilities and dot matrix type display of the present invention.

Summarizing, the present invention is directed towards cable companies who presently have or will have as a result of, FCC Syndex (Syndicate exclusivity) regulations, a requirement to switch off the video sources, which have been purchased in another market whose rebroadcast would violate exclusivity. Where, as set out above, a single channel message input at a broadcast source has been known and in common use such systems have been expensive. Accordingly, a cable company would be or will be required to have a single character generator for each channel to inform subscribers of the switch in programming as required by FCC regulations, the cost of which compliance will be prohibitively expensive.

Additionally, unlike the complex clocking arrangements of the cited patents, the present invention provides a simple switching arrangement that is operated by the horizontal and vertical drive pulses found in the video signal. In the present invention the input message information replaces a portion of the video signal as determined by a setting of a horizontal drive pulse counter, and switches back to the video signal at another setting of the horizontal drive pulse counter. The vertical drive pulse is used to reset the horizontal pulse counter. So arranged, the message input can conveniently replace the entire video signal or a portion thereof. While, of course, a number of systems like those set out above have involved a translation to digital, all have provided for conversion back to characters from the digital format for display. The present invention provides for a conversion of digital ASCII or other data format from the character generation to pixel for direct display as dots and vacant areas for forming characters on a video receiver screen much like a dot matrix printer. This means one character generator circuit can be used to create pixel data for numerous video displays.

SUMMARY OF THE INVENTION

It is a principal object of the present invention in a multi-channel message system and method to provide a system for simultaneously placing a message or messages on multiple non-synchronous video channels.

Another object of the present invention is to provide a television message system and method where, with a single character generator only, located at a broadcast or rebroadcast source, a single message or multiple messages can be synchronized into a video transmission on one or more separate non-synchronous channels.

Another object of the present invention is to provide a television message system and method whereby, with a single character generator only, situated at a broadcast or rebroadcast source, a single message or multiple messages can be simultaneously synchronized into a video transmission on one or more separate non-synchronous channels, which input is controlled by sensing horizontal drive sync and vertical drive sync pulses, and inputting the message into the video signal at a certain horizontal line.

Still another object of the present invention is to provide a system for converting input information into a message that is in digital form, that is in turn converted to pixel (picture element) data for direct display on a television receiver.

Still another object of the present invention is to provide an inexpensive television message system that will fully meet a basic need of a cable operator, or the like, to input an informative message or messages simultaneously onto one or a number of unsynchronized channels.

The present invention is in a multi-channel message display system and method that utilizes a single character generator only, for converting a digital input from any source that is in ASCII, or other data format, to pixel data for direct substitution for a portion of a video transmission or transmissions on separate non-synchronous channels The system is suitable for use by a broadcast or rebroadcast source, such as a cable company, that is or may soon be required to have a capability for message inclusion or substitute transmission on each of the non-synchronous channels it rebroadcasts.

The character generator is the major component in a control module and contains clocking for controlling ASCII message data input and storage, and memory for receiving the character generator output. A sync stripper is part of each channel module for each channel and is connected to receive the individual channel video, sensing horizontal and vertical drive pulses for that channel video to operate a switch controlled by a clock for switching on at a certain horizontal line in the pixel (picture element) digital message input and turning off at a certain following horizontal and vertical line. The pixel data is displayed as dots, much like a dot matrix printed message, on a portion of the television receiver in place of a section of the video.

Additional to the ability to blank a video signal off from a screen segment of each channel, and insert a message, the system can, by blanking the entire screen, switch in a different or substitute video input for the original.

DESCRIPTION OF THE DRAWINGS

In the drawings that illustrate that which is presently regarded as the best mode for carrying out the invention:

FIG. 3 is a more detailed block flow schematic of the controller and one of the channel modules of FIG. 1; and FIG. 4 shows examples (a) through (d) of different television screen configurations of master and character generator video.

DETAILED DESCRIPTION

An ability to place messages onto a broadcast video are not new and have been in common usage for a number of years. Such systems afford a broadcaster with a wide variety of message insertion capabilities and for such single channel broadcasters such systems are not inordinately expensive. However, for a cable television operator or other closed circuit television distributor simultaneously distributing one (1) to one hundred (100) or more non-synchronous video signals, such a message system as broadcasters use for each channel is prohibitively expensive. These cable operators and like re-broadcasters under current and emerging FCC regulations have a need to be able to black out a channel carrying a duplicate broadcast to one being carried on another channel, or a sporting event that is restricted from being shown in a certain local, and to substitute another program therefore.

The present invention provides the ability to place explanatory messages on the channel before and after the channel video is switched. The present invention can also place an early warning emergency alert message on all channels, the message routed through a channel module for each channel.

Figure 1:
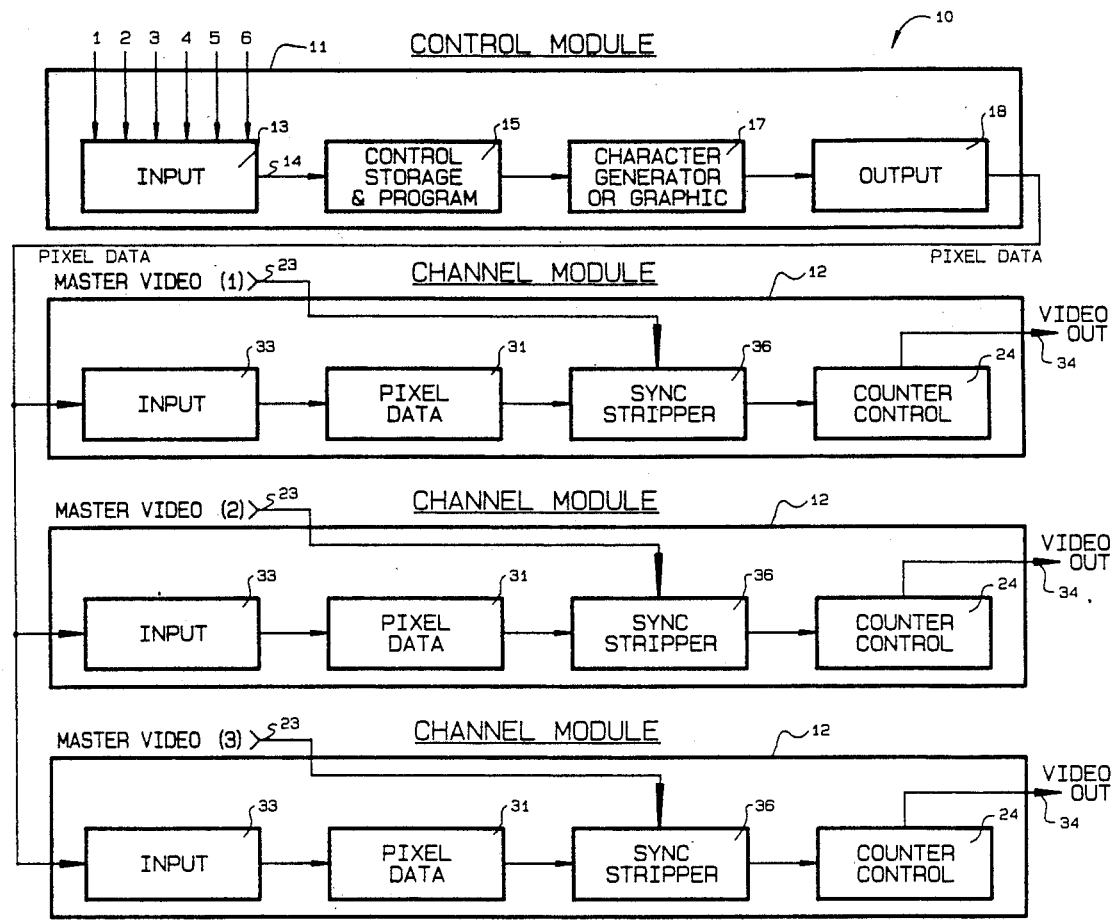
FIG. 1 is a block flow schematic of a multi-channel message display system of the present invention illustrating that the system utilizes a single controller and single pixel generating character or graphics generator for providing message inputs to a number of channel modules.
Figure 2:
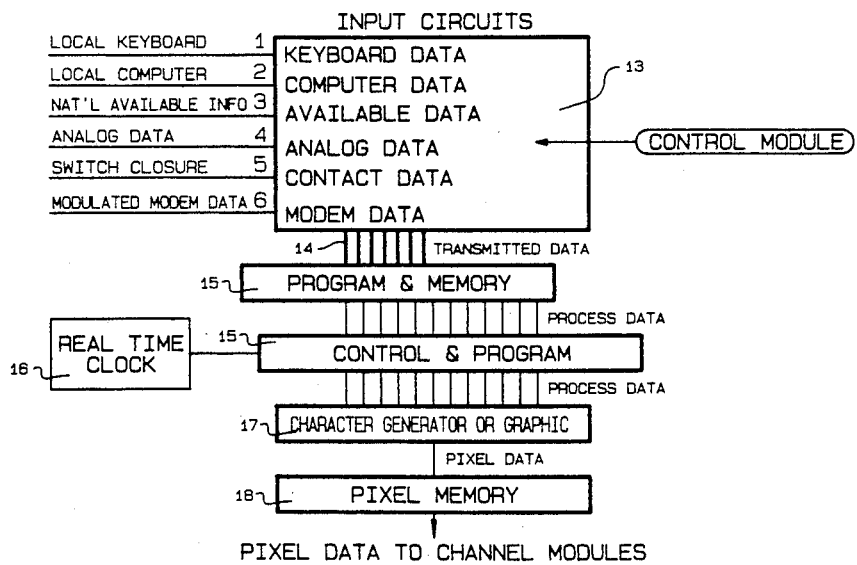
FIG. 2 is a block flow schematic of the controller module of FIG. 1 showing various message input data converted to digital pixel (picture element) form.

The present invention, as shown in FIG. 1, provides a multi-channel message display system 10, hereinafter referred to as display system, that simply and inexpensively meets the current and upcoming needs of a rebroadcaster as set out above. The display system 10 consists of a single control module 11 and a number of channel modules 12. One channel module for each channel. The channels are non-synchronous and accordingly the channel modules provide for synchronizing the message data from the control module 11 to the particular video signal being rebroadcast, as set out hereinbelow. As shown in FIGS. 1 and 2, the control module 11 includes an input circuit with a number of ports, shown as lines one (1) through six (6), and shown in FIG. 3, as input data 13a and ASCII data input 13b. The input ports shown in FIG. 2 are to receive a variety of input data, as for example, from: local keyboards (1); local computer (2); national available data (3), such as, but not limited to, NOAA, UPI, AP, or other news or commodity information; analog data (4), as may be from weather sensors, or the like, that is converted to digital in the input circuit; switch closure (5), such as switch information; and modulated modem data (6), which can be from any digital source delivered via modem. Shown in FIG. 2, the message input is passed shown as lines 14, for processing from the input circuits of the control module 13, in the form of ASCII, BAUDOT, or any other accepted form of digital data encoding for transmission. Shown in FIG. 2 the encoded data is processed in blocks 15 identified as a program and memory and control and program, that receive input from a real time clock 16 that is used to schedule display to the channel modules in real time. This signal processing is also shown in FIGS. 1 and 3 at block 15 identified as Control, Storage and Programming and ASCII data storage.

The control, storage and programming block shown in FIG. 1 represents a typical computer input, control, programming and output circuits that are capable of receiving, storing, timing, controlling, and outputting data under software control, and accordingly, as with the other control module blocks, will not be shown in greater detail. Similarly, the ASCII data storage block 15 of FIG. 3 is a typical memory storage file arranged for data to be displayed and, while ASCII is set out as the preferred binary coding scheme, other schemes could be so employed within the scope of this disclosure.

The ASCII data is then passed, to a character or graphics generator 17 that converts that data to binary which data can then be clocked as pixel (picture element) data into and summed with a video signal to create alpha numeric or graphic display on a video screen. Pixel data, of course, being a series of digital dots which define an object or character by their relative position with respect to the whole. In common usage the output of the character generator 17 ROM (read only memory) is pixel data. The channel module 12, as set out hereinbelow, commands the passage of the generated pixel data from a pixel memory 18. Pixel memory 18 functioning will be set out hereinbelow, but briefly, provides for clocking out the pixel data in binary form to be put in memory with the channel module 12 where it is synchronized with the video signal received on the particular channel.

Each channel involves a channel module 12 that provides synchronization as a sensing of a certain line of horizontal pulse whereat the pixel message data is substituted for or imposed on a video signal. The horizontal drive pulse, of course, provides an electron beam that is painted across a cathode ray tube, creating contrasting images The pixel data of the present system is displayed as white or black images over a gray background or over the existing video signal, the successive horizontal lines formed on the screen forming characters across the screen much like a dot matrix printer prints letters on a page.

As set out above, the present invention employs one control module 11 for processing digitized message data to pixel form for transmission to an individual channel module 12 for each channel. Accordingly, the channel modules 12, three (3) of which are shown in FIG. 1, are identical to one another and each has a capability for displaying the same or different pixel data in sync with the incoming video for that channel. To provide transmission, as shown in FIG. 3, a message enable relay 20, that is normally closed is opened, enabling a signal passage to gate 21 on receipt of a true signal. The relay 20 is used to prevent any level of distortion when the message is not enabled as present through line 22 from the control, storage and programming block 15. It is thereby insured that a failure of the channel module 11 will not disturb the normal signal path for the video input, shown as the master video base band 23.

The gate 21 ANDS the message enable signal and an output of a horizontal drive pulse (HDR) counter 24. The output of gate 21 enables gates 25 and 26, respectively. A gate 27, that is in series to gate 26, is provided to invert a signal from an HDR delay 28, enabling gate 26 only when gate 25 is not enabled. Enabling gate 26 provides for turning on a pixel clock 29 that clocks pixel data out from a pixel data storage block 31 that receives data from the pixel memory 18, through line 30.

The output of which pixel data storage 31 is present at the junction of switches 32 and 33. Switch 33 is on at all times except when data is being written onto the output from the pixel data storage 31 through switch 32. Switch 32 is enabled only during the actual time that the beam from the pixel data storage has the sync signals from the master or substitute video signal 23 or 41.

As set out above, it is the sensing of the video 23 or 41 horizontal drive pulse (HDR) that provides for insertion of the pixel data into the output video, shown as master video plus character generator 34, through switch 32. Also, the HDR transmission, through pixel clock 29, provides for synchronizing that pixel data with the master video.

The above set out data insertion and synchronization is provided by a pick-up of the master video through line 35 that is passed to a sync stripper 36. The sync stripper 36 is a commonly utilized well-known circuit used to separate synchronization signals from a video signal and so will not be individually set out. The horizontal and vertical drive pulses are separated and separately transmitted, shown at lines 37 and 38, respectively. The HDR is shown entering an input port of counter 24, with the VDR entering a reset port of counter 24.

The counter 24 is provided to count the HDR pulses, and at a set number of pulses from a reference, such as the first horizontal line, to pass on a signal from the output port through line 39 to gate 21. Which output signal is actually a decoded output signal passed to the counter from a counter control 40. The counter control provides, as set out below, for programming whereon a television screen the pixel information will be placed.

The counter 24 is reset by a vertical drive pulse (VDR) and counts horizontal drive pulses (HDR) to position pixel data into the video picture. Shown in FIG. 4 are examples (a) through (d) of some television screen configurations as can be produced by operation of the counter control 40 and counter 24. Further, the counter control and counter can provide for "blanking" entirely the master video 23 and inputting a separate substitute video 41 by operating a relay 45, as shown in FIG. 3, within the scope of this disclosure. On operation of which switch 45 a video signal rerouting occurs, the substitute video 41 replacing the master video 23.

As shown in FIG. 3, the HDR pulse is split and sent through line 42 to HDR delay 28. The pulse that is received at the HDR delay 28 is illustrated at 43. The HDR 28 circuit, in turn, outputs a pulse in the insertion area between HDR pulses. This output, illustrated at 44, allows the sync pulses from the master video 23 signal to drive the display in all cases and replace that master video signal 23 or substitute video 41 with the pixel information only during the actual on screen viewing time. HDR delay 28 would be used to position character generator data as shown in FIG. 4(c).

Pixel data may be used through a gating arrangement to control switches 32 and 33 so that video is replaced only when pixel data is present. This would in effect allow pixel data to be displayed in the middle of a horizontal line with video showing immediately before and immediately after display of the pixel data.

Pixel data may be loaded and stored in pixel data storage 31 at any time and will be synchronized with the incoming video signal only when it is activated and clocked out of memory.

As set out above, the character generator data is digital, consisting of ones and zeros, that are translated into pixel as white and black dots, the generated message appears on screen as letters or simple figures, much like a dot matrix printer forming letters on a piece of paper as an array of dots.

It should be understood that the blocks shown and described herein are electrical circuits that are configured to perform the described functions. The particular circuits are not believed to be in and of themselves unique and are generally well known in the industry. Accordingly, the individual circuits have not been set out herein. It should therefore be understood, that it is their arrangement together and functioning that is unique to the present invention.

A preferred embodiment of the present invention and its functioning have been set out herein. It should, however, be understood that this disclosure is made by way of example only and that variations to the invention are possible within the scope of this disclosure without departing from the subject matter coming within the scope of the following claims and a reasonable equivalency thereof, which claims I regard as my invention.

I claim:

1. A multiple channel message display system for a television broadcast or rebroadcast source comprising, a control module means that receives a digital signal input to be substituted for a portion or al of a video transmission, and includes a character generator means with clocking means and pixel memory for converting said digital signal input to pixel digital and control means for controlling transmission of said pixel digital to a plurality of channel module means; a plurality of channel module means one each for each of a plurality of non-synchronous video channels and includes a pixel data storage means that receives said pixel digital from said control module means; and means for clocking said pixel digital into a video signal broadcasted on each said video channel and includes means for synchronizing said pixel digital into each said video signal.

2. A multiple channel message display system as recited in claim 1, wherein the control module means is arranged to receive the digital signal input through any of a number of ports, each for receiving a separate digital signal input.

3. A multiple channel message display system as recited in claim 2, wherein the digital signal input is in ASCII format.

4. A multiple channel message display system as recited in claim 1, wherein the character generator means clocks said pixel digital into said pixel memory that is separately clocked into each of the channel module means for insertion into the video signal.

5. A multiple channel message display system as recited in claim 1, wherein the control means in each of the control module means is linked through a gate means in each of the channel module means that provides a message enable, allowing transmission of the pixel digital from the control module means, on command from the means for synchronizing.

6. A multiple channel message display system as recited in claim 1 further including a relay means in each of the channel module means that is connected in parallel to a connecting line from the pixel memory for preventing distortion when pixel digital information passage is not enabled.

7. A multiple channel message display system as recited in claim 1, further including, in each of the channel module means, said pixel data storage means that is connected to said clocking means and is to receive the pixel digital from the pixel memory of the control module means for clocking said pixel digital therefrom for insertion into the video signal.

8. A multiple channel message display system as recited in claim 1, further including switch means arranged for switching between a master video signal and a substitute video signal for providing the video signal wherein the pixel digital signal is inserted.

9. A multiple channel message display system for a television broadcast or rebroadcast source comprising, a control module means that receives a digital signal input to be substituted for a portion or all of a video transmission, and includes a character generator means with clocking means and pixel memory for converting said digital signal input to pixel digital for transmission to a plurality of channel module means; an plurality of channel module means one each for each of a plurality of non-synchronous video channels, each providing means for clocking said pixel digital into a video signal broadcasted on each said video channel and includes means for synchronizing said pixel digital into said video signal which is a sync stripper circuit that connects to the video signal and is to separate horizontal and vertical drive pulses from that said video signal; and a counter means for receiving the horizontal and vertical drive pulses, and at a pre-set number of said horizontal drive pulses, to command insertion of the pixel digital into said video signal, which counter means commands the removal from or turns off the pixel digital from the video signal and includes a horizontal drive pulse delay circuit that is connected in parallel to said counter means to provide a signal presence at a switch means for enabling passage of the pixel digital signal into the video signal.

* * * * *